March 3, 1959
J. R. PIERCE
2,876,380
MULTIELECTRODE TRAVELING WAVE TUBE
Original Filed Aug. 17, 1949
8 Sheets-Sheet 1
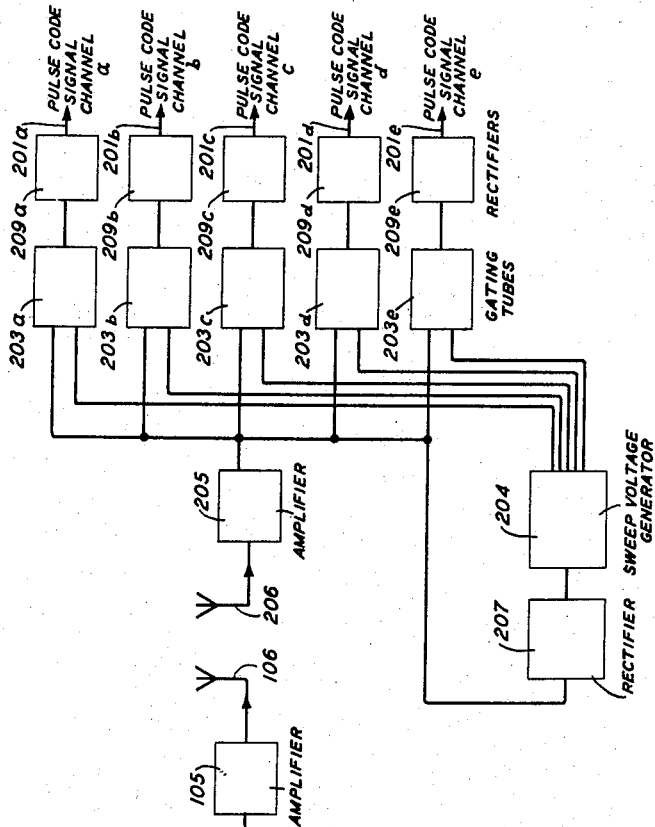
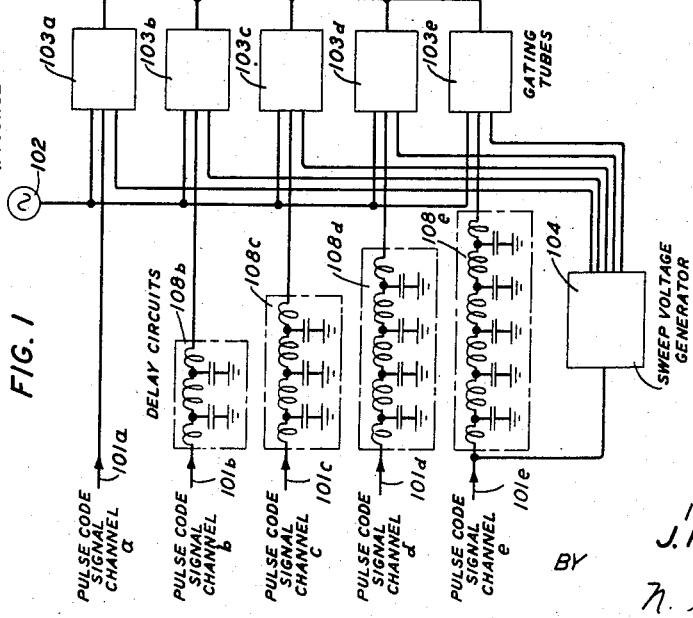
INVENTOR
J. R. PIERCE
BY
N. S. Ewing
ATTORNEY March 3, 1959  J. R. PIERCE  2,876,380
MULTIELECTRODE TRAVELING WAVE TUBE
Original Filed Aug. 17, 1949  8 Sheets-Sheet 3
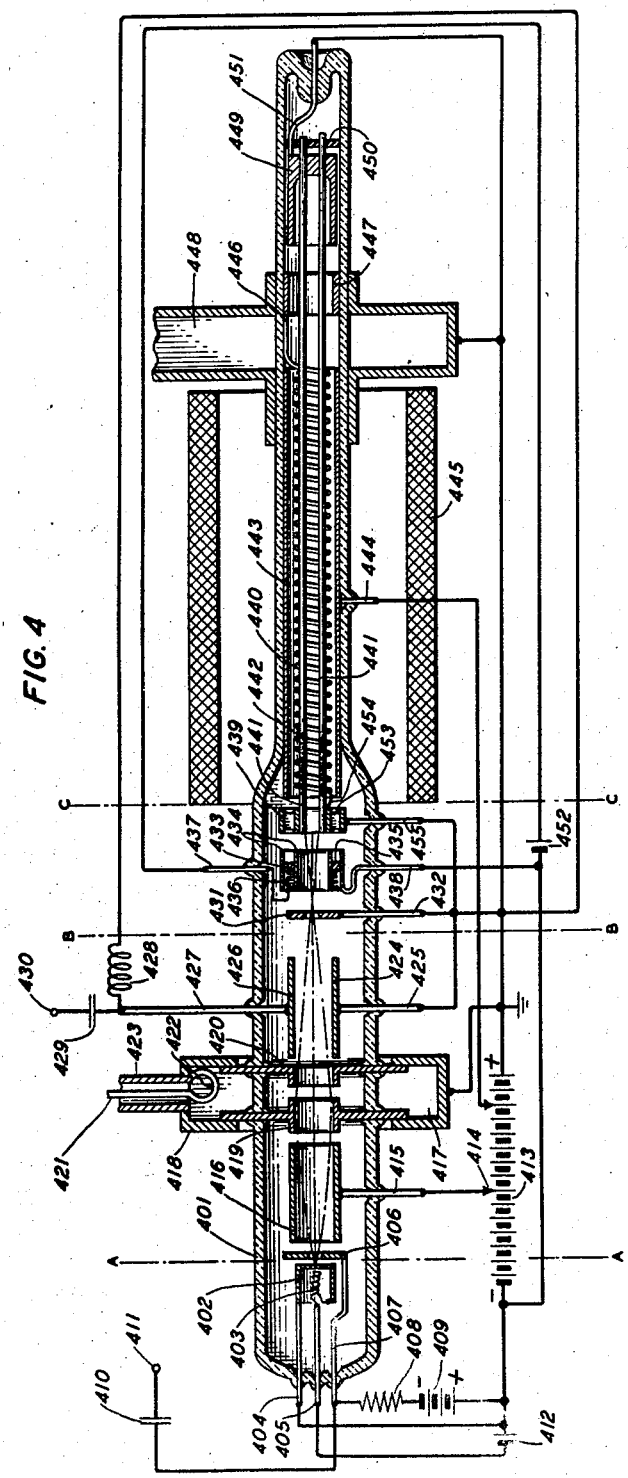
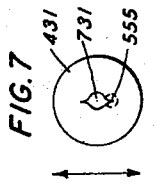
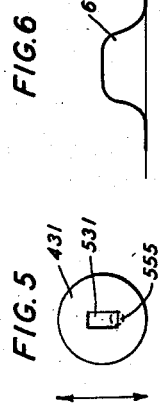
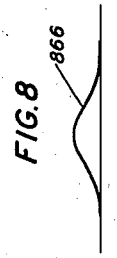
INVENTOR
J. R. PIERCE
BY
N. A. Ewing
ATTORNEY

INVENTOR
J. R. PIERCE
BY

ATTORNEY

March 3, 1959  J. R. PIERCE  2,876,380
MULTIELECTRODE TRAVELING WAVE TUBE
Original Filed Aug. 17, 1949  8 Sheets-Sheet 5

INVENTOR
J. R. PIERCE
BY
N. D. Ewing
ATTORNEY

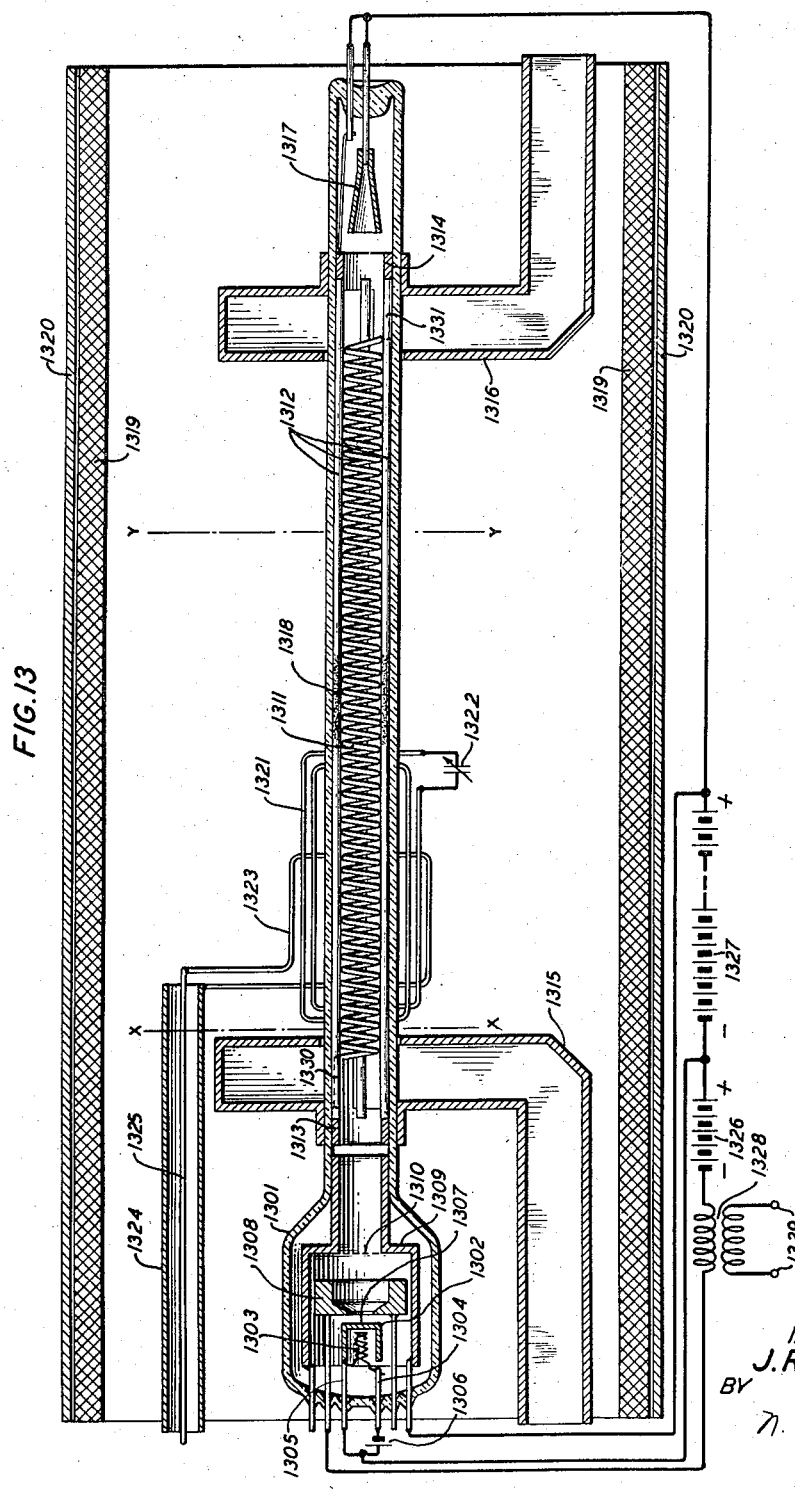

March 3, 1959 J. R. PIERCE 2,876,380
MULTIELECTRODE TRAVELING WAVE TUBE
Original Filed Aug. 17, 1949 8 Sheets-Sheet 7
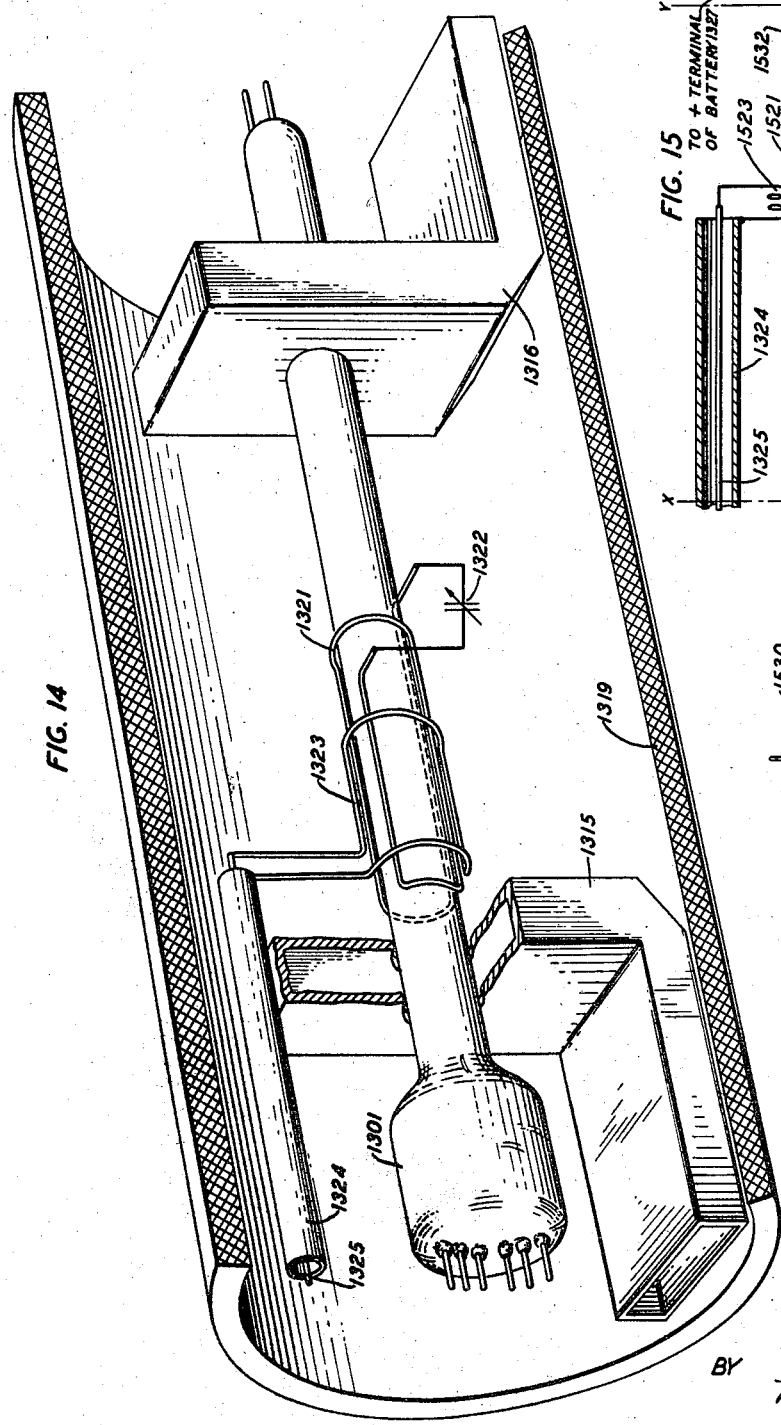
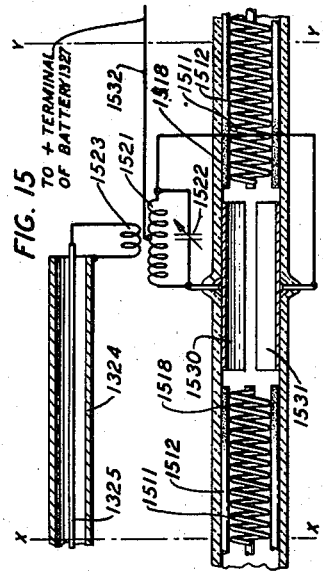
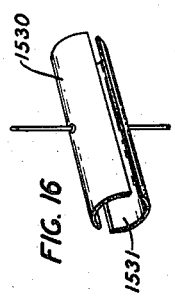
INVENTOR
J. R. PIERCE
BY
N. A. Ewing
ATTORNEY

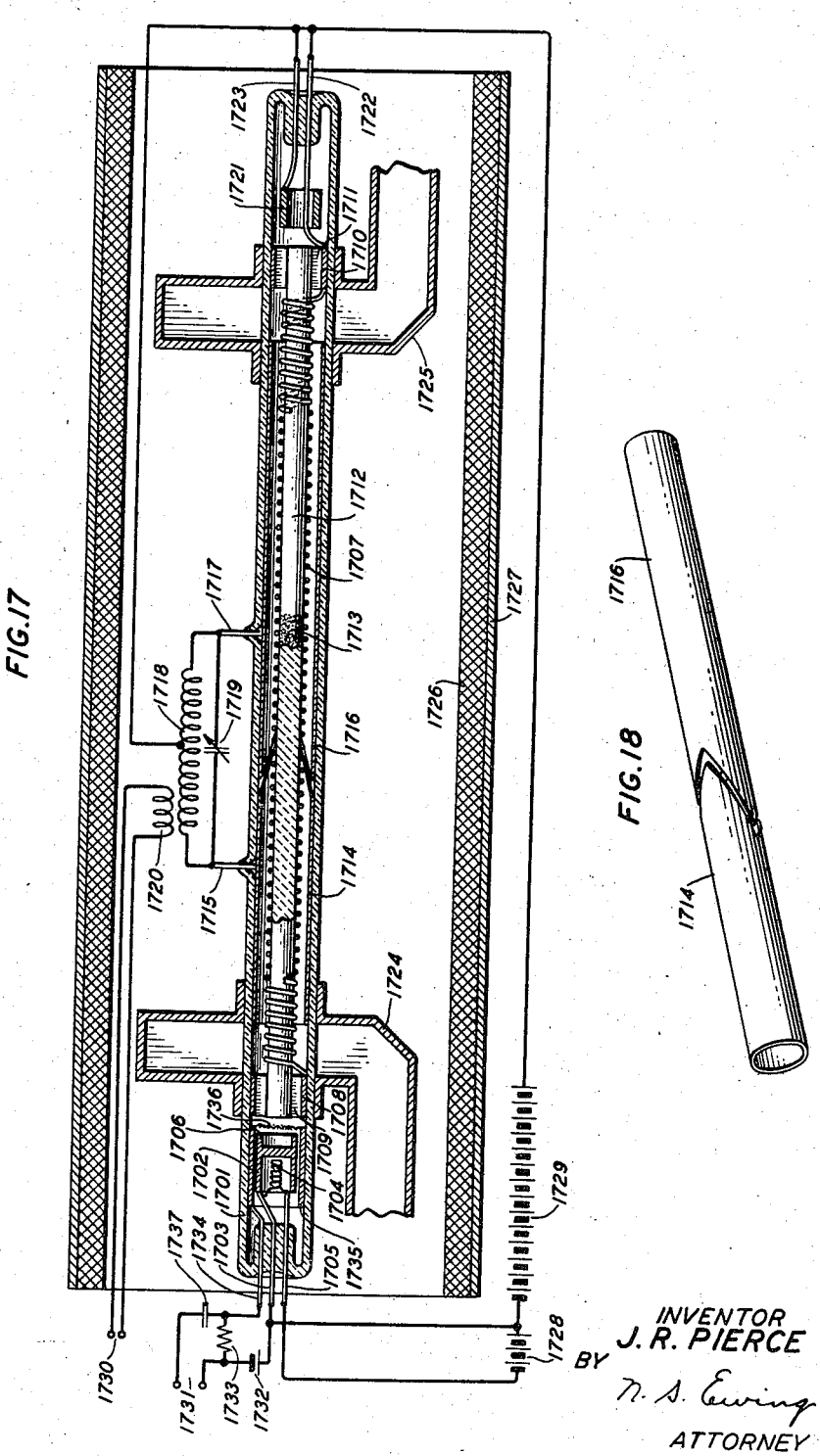

United States Patent Office 2,876,380
Patented Mar. 3, 1959

2,876,380

MULTIELECTRODE TRAVELING WAVE TUBE

John R. Pierce, Berkeley Heights, N. J., assignor to Bell Telephone Laboratories, Incorporated, New York, N. Y., a corporation of New York Original application August 17, 1949, Serial No. 110,851, now Patent No. 2,719,187, dated September 27, 1955. Divided and this application August 15, 1952, Serial No. 304,535

27 Claims. (Cl. 315—3.6)

This invention relates to electric beam discharge devices and associated circuits and, more especially, to high frequency apparatus involving cumulative interaction between an electron beam and a distributed high frequency transmission circuit such as is found, for example, in the so-called traveling wave tube.

This application is a division of application Serial No. 110,851, filed August 17, 1949, since issued as Patent 2,719,187, September 27, 1955, entitled "High Frequency Pulse Transmission," and it is being filed pursuant to a final requirement for division.

In the parent application, there is disclosed a multiplex pulse code transmission system that entails the generation and distance transmission of exceedingly short, accurately spaced pulses of high frequency carrier wave corresponding to coded sequences of direct-current pulses that contain the signal information to be transmitted. Sharp pulses of the character contemplated require wideband circuits for their generation and undistorted transmission. Such wide bands are practically impossible of achievement in direct-current pulse circuits, inasmuch as the latter tend to produce pulses that are lengthened and otherwise distorted to such an extent that they cannot be used for direct modulation of the carrier wave.

One of the objects of the invention is to circumvent the foregoing limitations of direct-current pulse circuits. A related object is to overcome the effect of carrier wave pulse distortion on the reception of such pulses.

The present invention, in one of its aspects, contemplates the application of carrier waves to a high frequency electronic amplifier, such as the traveling wave tube, that can accommodate the aforementioned wide frequency band associated with short pulses; and the gating or intermittent conditioning of the amplifier to operate, in synchronism with the signal pulses to be transmitted or received, but for fixed periods independent of these pulses. At a transmitting station, direct-current signal-representing pulses are employed for concurrent gating of the amplifier so that the amplifier delivers a carrier wave pulse, of short length fixed by the gating period, when and if one of the direct-current pulses is present. At a receiving station, the amplifier delivers a short pulse upon the coincident gating or conditioning of the amplifier to operate and the arrival of a synchronized modulated pulse.

In accordance with a feature of the invention, the aforementioned high frequency amplifier comprises a traveling wave tube or the like in which an electron beam is directed along a slow wave circuit in interacting relation therewith and a beam deflector that deflects the beam out of interacting relation with the slow wave circuit except for predetermined short intervals when it is desired that the amplifier be operative.

A further feature resides in the beam being rectilinear in the operative condition of the amplifier, wherefore it can be, and is, maintained by focussing elements in the desired critical interacting relation with the circuit during operative intervals.

Another important feature of the invention resides in the combination of modulation, gating, and amplification functions in the microwave frequency range in a single electronic tube.

In accordance with another feature, one end of the slow wave circuit, e. g., the helix, is terminated by lossy material distributed along the end portion of the circuit.

Other objects, advantages, and additional features will be apparent from the following description of certain specific embodiments of the principles of the invention, as shown in the drawing.

In the drawing:

Figs. 1 and 2 are block schematics of a multichannel pulse code modulation system according to the invention, showing the transmitter and receiver, respectively;

Fig. 4 illustrates the construction and circuit of a helix type of traveling wave gating tube for producing the very short high frequency pulses;

Fig. 5 shows a form of aperture which may be used in the tube of Fig. 4;

Fig. 6 shows the shape of the pulse resulting from the use of the Fig. 5 aperture;

Fig. 7 shows an aperture alternative to the Fig. 5 aperture;

Fig. 8 shows the shape of the pulse resulting from the use of the Fig. 7 aperture;

Figs. 13 and 14 illustrate a structure for much the same purpose as that of Fig. 4 but in which magnetic deflection of the electron stream is employed;

Figs. 15 and 16 show a modification of the tube of Fig. 13 in which electric rather than magnetic deflection is employed; and Figs. 17 and 18 illustrate another tube for much the same purpose as that of Fig. 4 but utilizing two interleaved metallic sleeves to produce deflection of the electron stream.

Before entering on a detailed description of the electronic tubes of the traveling wave type and their immediately associated circuits, which are of the primary importance in the present divisional application, a representative system in which this type of electronic tube arrangement would be useful will be described in some detail.

Figure 3:
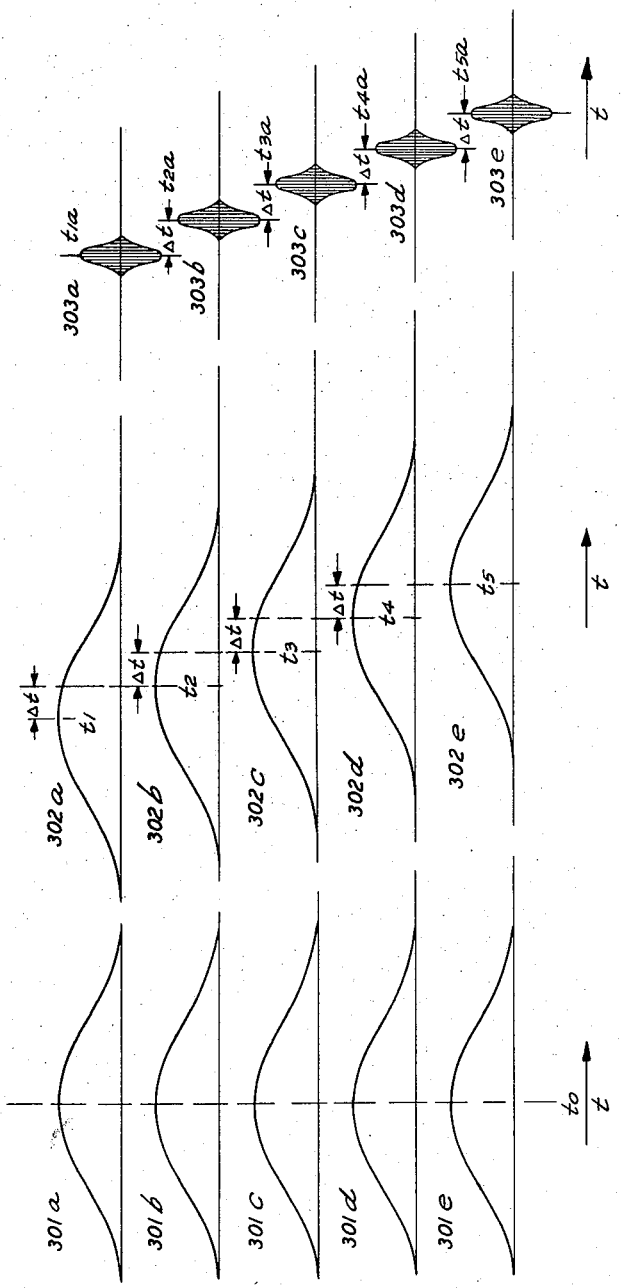
Fig. 3 is a diagram used in explaining the production of the transmitted pulses.

Fig. 1 shows a multichannel pulse code modulation transmitter according to the invention. This transmitter functions to combine the signals of several pulse code modulation coding circuits, each of which produces relatively long pulses with a low repetition rate, into one channel using short pulses and a high repetition rate. For example, the outputs of five pulse code modulation circuits or channels derived from five separate coders may be connected one to each of the leads 101a—101e, the channels being distinguished by the letters a, b. c, d, and e. While five channels are shown in the system illustrated, the number may be either more or less. It is assumed that the pulses and spaces from these channels through means included in the coding circuits are received in synchronism as shown to the left in Fig. 3. Here at 301a—301e are typical pulses applied to the five leads 101a—101e, each of which is centered around a time $t_0$. In Fig. 1 the pulses applied to lead 101a go directly to a gating tube 103a. (Each of the gating tubes 103a—103e, as will be described later, is arranged to produce at appropriate times a very short pulse when excited by a pulse supplied to it through one of the leads 101a—101e.) The pulses from channel $b$ through lead 101b go through a single section delay circuit 108b, producing a delay $\Delta t$, before going to gating tube 103b. The pulses from channel $c$ through lead 101c go through a two-section delay circuit 108c, producing a delay $2\Delta t$, before going to gating tube 103c. The pulses through lead 101d go through a three-section delay circuit, producing a delay $3\Delta t$, before going to gating tube 103d and the pulses through lead 101e go through a four-section delay circuit, producing a delay $4\Delta t$, before going to gating tube 103e. The delay circuits 108b—108e may consist of series inductances and shunt capacitances with terminating half-section inductances as shown in Fig. 1 or they may be of any other type providing the desired delays in transmission of the pulses. The delay time $\Delta t$ is preferably chosen so that the time spacing between pulses in the channels such as those connected to leads 101a—101e is the number of channels times $\Delta t$, or in the five-channel exemplary system of Fig. 1, $5\Delta t$. Thus, the effect of the delay circuits is to space the pulses applied to the gating tubes 103a—103e from the channels through the lines 101a—101e evenly in time but one-fifth of the repetition period apart, as shown in the center of Fig. 3. The pulses from the leads 101a—101e will still be unchanged in length, however, and will overlap as shown in the center of Fig. 3.

The long pulses from the channels attached to the leads 101a—101e, properly delayed as indicated above, are applied to the modulator terminals of the gating tubes 103a—103e so that an output pulse from these tubes can occur only when an input pulse from leads 101a—101e is present. A radio frequency source 102 excites the inputs of the gating tubes 103a—103e. A sweep voltage generator 104 applies beam deflecting voltages to the gating tubes. The position of the electron beam in these tubes determines their ability to transmit. The deflecting voltages applied from the generator 104 differ successively in phase so that the tube 103a is enabled to transmit for a brief interval at the center of the pulse position of channel $a$. Tube 103b is enabled to transmit for a brief interval at a time $\Delta t$ later at the center of the pulse position as delayed by the delay circuit 108b. Tube 103c is enabled to transmit at a time $2\Delta t$ later than 103a, at the center of the pulse position as delayed by the delay circuit 108c. Similarly 103d and 103e are enabled to transmit at times $3\Delta t$ and $4\Delta t$ later, respectively, so that each of the tubes 103a—103e is enabled to transmit at the center of the pulses reaching it, the pulses to 103b—103e being delayed. The effect of the gating tubes 103a—103e is to change the long pulses reaching them as shown at the center of Fig. 3, designated 302a—302e, to short radio frequency pulses which do not greatly overlap as shown at the right of Fig. 3, designated 303a—303e. These pulses are then combined and form the input to a single radio frequency amplifier 105, which may be of a traveling wave or other suitable type, and the short radio frequency pulses which carry the information from the leads 101a—101e in a time division manner are radiated from the antenna 106.

In order to synchronize the sweep voltage generator 104, some source of synuchronizing signal must be made available. In the showing of Fig. 1 it is assumed that this is done by reserving channel $e$ not for conveying intelligence but for synchronization purposes. To this end, the signal applied to lead 101e is made to consist of alternate pulses and spaces, as, pulse, space, pulse, space, etc. Thus the signal has a frequency component corresponding to half the repetition rate or repetition frequency and this component is taken from lead 101e to sweep voltage generator 104 to maintain synchronism. Sweep voltages are supplied by the generator 104 to the gating tubes 103a—103e in different phase relations such as to permit pulses reaching these tubes at the various times as 302a—302e, Fig. 3, to be transmitted as 303a—303e, Fig. 3, to the amplifier 105.

Fig. 2 shows a multichannel receiver by means of which the short pulses transmitted by the circuit of Fig. 1 and representing a time division transmission of five separate pulse code modulation channels connected to leads 101a—101e may be sorted out into separate channels again. The radio frequency pulses are received by antenna 206 and amplified by radio frequency amplifier 205 which may be of a traveling wave or other suitable type. A portion of the output of this amplifier goes to rectifier 207. Because of the synchronizing signal sent by the channel connected to lead 101e of Fig. 1 there will be a frequency component in the output of the rectifier of half the repetition rate of the pulses applied to any one of the channels connected to leads 101a—101e of the transmitter. The output of the rectifier is applied to a sweep voltage generator 204. This sweep generator is similar to the sweep generator 104 of Fig. 1 and its output is applied to the sweep terminals of gating tubes 203a—203e to deflect the electron beams. The deflecting voltages applied by this sweep generator differ successively in phase and by the above-mentioned synchronizing signal are kept in phase with the transmitted pulses. The gating tubes 203a—203e are therefore in turn enabled to pass received pulses transmitted on their respective channels. The radio frequency input to the gating tubes 203a—203e consists of the received radio frequency pulses and is supplied from the amplifier 205. The short radio frequency pulses 303a—303e illustrated to the right in Fig. 3 indicate the type of the input to the gating tubes 203a—203e. Of the series of these pulses, if the first can pass through tube 203a and not through any of the other tubes 203b—203e, because the electron beam is allowed to go through only one of these tubes at a time, then this first pulse can produce an output only from tube 203a. Similarly a pulse in the following position can produce an output only from tube 203b, the next from tube 203c, the next from 203d, the next from 203e and the following from 203a again. Even if a given tube of the series 203a—203e is in a state to produce a pulse in its output because of the near-zero value of the instantaneous sweep voltage produced by the sweep generator 204 allowing the electron beam to go through, it will not produce an output pulse unless it is supplied at the same time with a radio frequency pulse input from the antenna 206 by way of amplifier 205. Thus, because of the gating only every fifth pulse can produce output from any one tube, such as 203a, and there will be output only if this particular pulse is present rather than absent. The outputs from the tubes 203a—203e are in the form of short radio frequency pulses. These pulses are rectified by the rectifiers 209a—209e which include filters for broadening the pulses. If it were not for the filter, the output pulses would have the appearance shown at the right on Fig. 3, but, after passing through the filter, they have the appearance shown at the center of Fig. 3.

Thus there is delivered at the terminal leads 201a—201e of the receiver the pulse code modulation signals of the five channels applied to the leads 101a—101e respectively of the transmitter.

Proceeding now to a consideration of the electron tubes with which we are primarily concerned in the present application, a preferred embodiment of the gating tube (103a—103e in Fig. 1 and 203a—203e in Fig. 2) is shown in Fig. 4. This is a traveling wave type of tube. In this figure, 401 is an evacuated envelope which may be of glass or other suitable material. 402 is a thermionic cathode coated, on the central portion of the flat surface facing to the right, with emissive material which is heated by a coiled heater 403. The cathode 402 is connected to lead 404 which is sealed through the envelope 401 in a vacuum tight manner. One end of the heater 403 is connected to the cathode 402 and the other is brought out through the envelope 401 by means of lead 405. Battery 412 supplies current to the heater which, in turn, heats the cathode. The electron current flow from the cathode is controlled and focused by modulating electrode 406 which is connected to lead 407. The battery 409 is used to adjust the mean current flow. The voltage from the battery 409 is applied to the modulating electrode 406 through a resistance 408 to allow the application of a pulse or other signal from input terminal 411 through capacitor 410 to modulating electrode 406. The electron stream is accelerated by tubular electrode 416 which is supported from the envelope by lead 415 and which is held positive to the cathode by a voltage tapped at 414 from battery 413. Electrode 419 which is held positive with respect to the cathode 402 and also with respect electrode 416 cooperates with electrode 416 in forming an electron lens in the gap between electrodes 419 and 416. Tap 414 on battery 413 is adjusted to focus the electron stream, or beam, on a small central aperture in electrode 431. Electrodes 419 and 420, which are supplied with a direct-current potential by battery 413 are connected by member 418 to form an axially symmetrical cavity resonator 417. A radio frequency input applied to the coaxial line formed by conductors 421 and 423 is introduced into this resonator by coupling loop 422 and excites the resonator producing a radio frequency voltage between the opposed tubular portions of electrodes 419 and 420. This voltage serves to velocity modulate the electron beam passing through the center of the resonant cavity 417. The electron beam may be deflected in the region between electrodes 420 and 431 by means of two deflecting plates 424 and 426. One of these, 424, is connected by means of lead 425 to the positive pole of battery 413. The other, 426, is connected by means of lead 427 to the same positive pole of battery 413 through a choke coil or impedance 428 so as to allow a deflecting voltage applied to terminal 430 through capacitor 429 to excite deflecting plate 426. Electrode 431 is connected to the positive pole of battery 413 through lead 432. 433 is a thermionic cathode which is heated by a coiled heater 436. One side of the heater 436 is connected to the cathode 433 and to one pole of battery 452 through lead 438. The other side of the heater is connected to the other pole of battery 452 through lead 437 so that battery 452 supplies power to the heater 436. Cathode 433 has an emissive coating 435 in the form of a ring on its surface opposite the heater 436. On both the outside and the inside of the ring there are projecting edges 434 which serve to focus and concentrate the electron flow from the emissive coating located in the annular cup between these edges. Cathode 433 is connected to the negative pole of battery 413 by means of lead 438. An accelerating electrode 439 is connected to the positive pole of battery 413 through lead 455 and serves to accelerate the electrons from cathode 433. Electrode 439 consists of two short coaxial cylinders tied together by one or more radial fins 453. 440 is a helix wound of such pitch that as a transmission line it has a phase velocity at the frequency impressed upon the coaxial lines 421 and 423 substantially equal to the velocity of the electrons from cathodes 402 and 433. The helix is supported by two or more ceramic rods 441 which rest at one end in the electrode 439 and at the other end in holes in a supporting insulating washer 450. One end of the helix is terminated electrically in its characteristic impedance by means of loss material 442, capable of absorbing energy from a high frequency field. Such loss material may conveniently be sprayed or evaporated onto the ceramic rods At this same end the helix is connected to the electrode 439 by means of a connection 454 and so is at the potential of the positive pole of battery 413. At the other end the wire forming the helix is straightened out parallel to the axis of the tube in a straight section 446 and connected to member 447 which rests against the inside of the glass envelope 401 and by-passes the termination 446 of the helix through the envelope to the metal wall of the wave guide 448. The straight wire passes through the output wave guide 448 in such a manner as to match the impedance of the helix to the characteristic impedance of the wave guide so that any electromagnetic energy traveling to the right along the helix is completely radiated into the wave guide. Electrons from cathode 402 pass into the interior of the helix 440 at the left-hand end. Electrons from cathode 433 pass between the helix 440 and a thin cylindrical metal conductor 443 which is supported on the inside wall of the envelope 401 and is connected through lead 444 to the battery 413. As is indicated in Fig. 4 this lead 444 may be connected to the battery 413 to apply a voltage to the cylinder 443 which is lower than the voltage applied to the helix 440 so that positive ions in the electron stream which may contribute to noise may be removed and collected by the cylinder. The electrons from cathode 433 are finally collected on electrode 449 which is connected by means of lead 451 to the positive pole of battery 413. The field of a solenoid 445 is used to confine and focus the electron stream from cathode 433 so that a substantial portion of it passes between electrode 443 and helix 440 and reaches collector 449.

In operation the radio frequency voltage impressed on the coaxial line consisting of conductors 421 and 423 will excite a signal in the helix 440 if the modulator electrode 406 is at such a potential as to allow the emission of the electrons from the cathode 402 and if the voltage between the deflecting plates 424 and 426 is sufficiently low to allow any electrons emitted to pass through the aperture in electrode 431. As the tube is ordinarily used, a sinusoidal sweep voltage will be applied between the deflecting plates 424 and 426 so that electrons can pass through the aperture in electrode 431 twice each cycle, when the sweep voltage is rising or falling through zero. Thus, at these times when the voltage is near zero, the left end of the helix 440 can be excited by short radio frequency pulses or signals applied through the coaxial line 421, 423. Whether or not the helix will be excited at a time near zero of the deflecting voltage depends on the signal impressed on the modulator electrode 406 through terminal 411 at that time, because this signal controls the electron current flow from cathode 402 and determines whether or not an electron beam from that cathode is present. When the helix is excited by the radio frequency component of the electron beam passing through the aperture in electrode 431 this excitation increases in amplitude along the helix because of the traveling wave gain due to the interaction of the electrons from cathode 433 and the electromagnetic field of the helix, so that a much amplified radio frequency signal is radiated into the wave guide 448.

The shape of the radio frequency output pulse produced when the electron beam from cathode 402 is swept or deflected past the aperture in electrode 431 can be controlled by controlling the shape of that aperture. In Fig. 5 electrode 431 is shown looking along the axis of the tube. The arrow shows the directions of sweep. In Fig. 5 the aperture 531 is rectangular and long compared with the diameter of the electron beam 555 so that a roughly rectangular pulse 656 as shown in Fig. 6 will be produced. In Fig. 7 a different shaped aperture 731 is shown, which will produce a broad smooth pulse 866 as shown in Fig. 8. Other pulse shapes can easily be obtained.

This embodiment (Fig. 4) of the gating tube is utilized in the transmitting system of Fig. 1 by connecting one in at each of the positions 103a, 103b, 103c, 103d and 103e as follows: The radio frequency input coaxial line 421, 423 is connected to receive energy from the radio frequency source 102 in Fig. 1. The modulator electrode input terminals 411 and a ground connection are connected to receive pulse signals from the several signal channels, the tube at 103a from lead 101a and the others from the delay circuits 108b—108e of the other channels. The deflecting plate terminals 430 and a ground connection are connected to receive energy from the sweep generator 104 in the proper phases for the respective channels. The output wave guides 448 are connected to deliver energy to the amplifier 105 and thence to the transmitting antenna 106. Thus, when the sweep voltage generator 104 positions the electron beams to pass through the aperture in electrode 431 of Fig. 4 at the times required by the different signal channels, a pulse of radio frequency energy from source 102 will be radiated from the antenna 106 whenever pulse signals are present in those channels.

When the tube shown in Fig. 4 is utilized in the receiving system of Fig. 2, one is connected in at each of the positions 203a, 203b, 203c, 203d and 203e as follows: The radio frequency input coaxial line 421, 423 is connected to the output of the amplifier 205 to receive the incoming radio frequency pulses from the antenna 206. The modulator electrode input terminals 411 are not used, the electrode serving only to adjust and focus the electron current flow from the cathode. The deflecting plate terminals 430 and a ground connection are connected to receive energy from the sweep generator 204 in the proper phase for the respective channels. The output wave guides 448 are connected to deliver energy to the rectifiers 209a—209e. Thus, the incoming pulses passing through amplifier 205 are applied to the inputs of all of the gating tubes 203a—203e and as the sweep voltage generator 204 positions the electron beams to pass through the respective apertures in electrodes 431 of Fig. 4 at the respective times when pulses may be sent from the various channels at the transmitter, each incoming pulse passes through only the gating tube in its channel (203a, 203b, 203c, 203d or 203e) and to a rectifier (201a, 201b, 201c, 201d or 201e).

Figure 9:
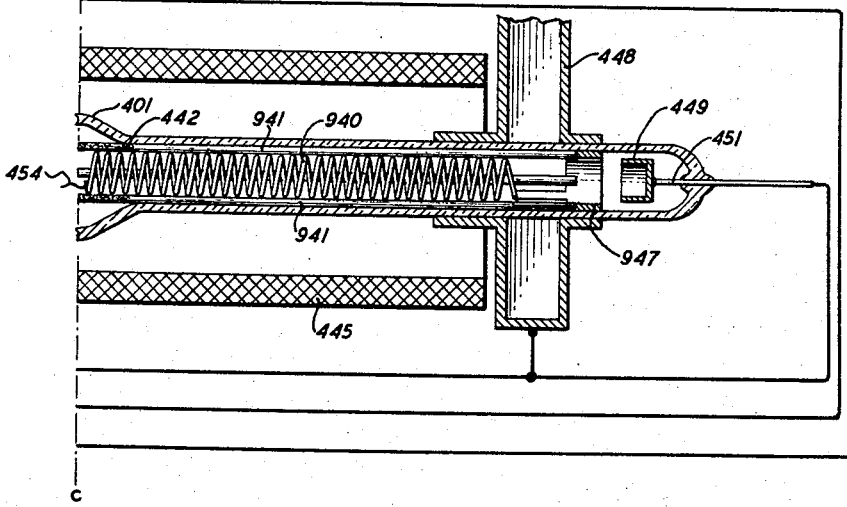
Fig. 9 shows as an alternative the use of a larger diameter helix in the tube of Fig. 4.

Fig. 9 shows a modification of a part of the tube shown in Fig. 4. In Fig. 4 the portion to the right of the vertical broken line C—C may be replaced by the portion shown in Fig. 9. In that case, the small helix 440 of Fig. 4 is replaced by a larger helix 940 of Fig. 9 and the electrons from both cathode 402 and cathode 433 pass inside of the helix. In Fig. 9 the supporting rods 941 are outside of the helix 940 between the helix and the envelope 401. The loss material 442 is sprayed or evaporated on the rods near the left end of the helix as in Fig. 4.

Figure 10:
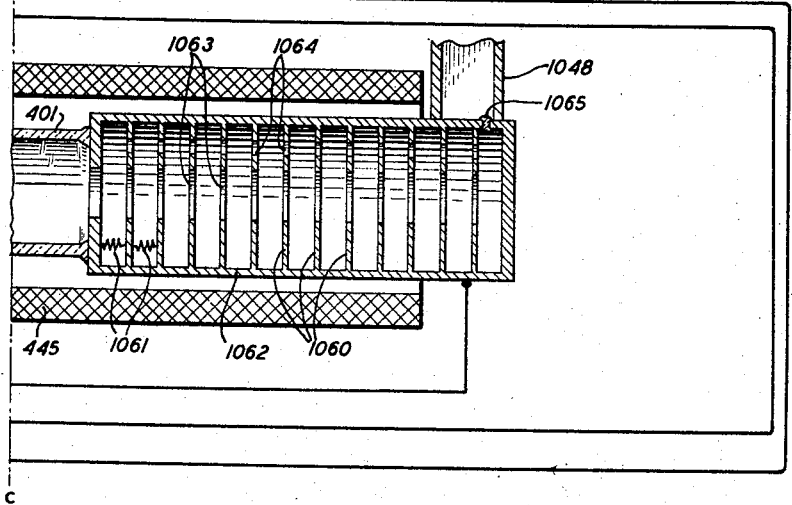
Fig. 10 shows as an alternative to the helix of Fig. 4 the use of a wave-guide type of structure.

Fig. 10 shows another possible modification of the portion of the tube of Fig. 4 to the right of the vertical broken line C—C. In this modification a traveling wave circuit other than a helix is used. This circuit consists of a number of apertured discs 1060 spaced evenly in a metal tube 1062 so as to form a loaded wave guide or a wave-guide filter network with a phase velocity at the radio frequency employed substantially equal to the velocity of the electrons. The discs 1060 may have large center apertures 1063 through which both electron streams pass and small apertures 1064 providing coupling between the resonant spaces between the discs for the purpose of controlling the phase velocity of the structure. The structure is terminated in its characteristic impedance at the left-hand or input end, by means of resistive elements 1061 shunting the resonant spaces between the discs. At the right the structure is coupled to a wave guide 1048 by means of a glass sealed window 1065 which allows radio frequency power to flow into the wave guide but provides a vacuum tight seal. The whole structure is sealed to the glass envelope 401 at the left in a vacuum tight manner. The output wave guide designated 1048 functions the same as the output wave guide 448 of Fig. 4.

Figure 11:
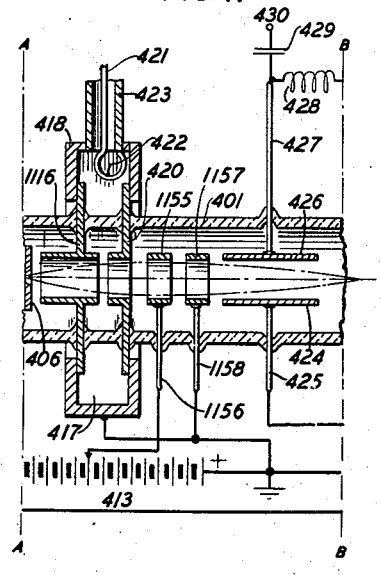
Fig. 11 shows a modification of the structure of Fig. 4 in which the electric lens acts on the electron stream farther along on its path.

Fig. 11 shows a modification of the structure of Fig. 4 in which the electron lens acts on the electron stream from cathode 402 after it has passed through the resonator by which it may be velocity modulated. The showing of Fig. 11 may be substituted for the portion of Fig. 4 between the two vertical broken lines A—A and B—B. In Fig. 11 the electron lens is formed by elements 420, 1155 and 1157 and, as will be seen, acts on the electron stream after it has passed through the resonator 417 formed by attaching the structure 418 between the disc electrodes 1116 and 420, the same as it is attached to electrodes 419 and 420 in Fig. 4. In Fig. 11 the electrodes 1116, 420 and 1157 may be connected to the positive pole of battery 413, the last by means of lead 1158, and element 1155 may be connected through lead 1156 to an intermediate point on battery 413, this intermediate point being chosen so as to focus the electron beam from cathode 402 on the aperture in the disc 431 of Fig. 4. The disposition of the deflecting plates 424 and 426 and of their leads 425 and 427 is shown in relation to elements 1116, 420, 1155 and 1157 in Fig. 11 for clarity.

Figure 12:
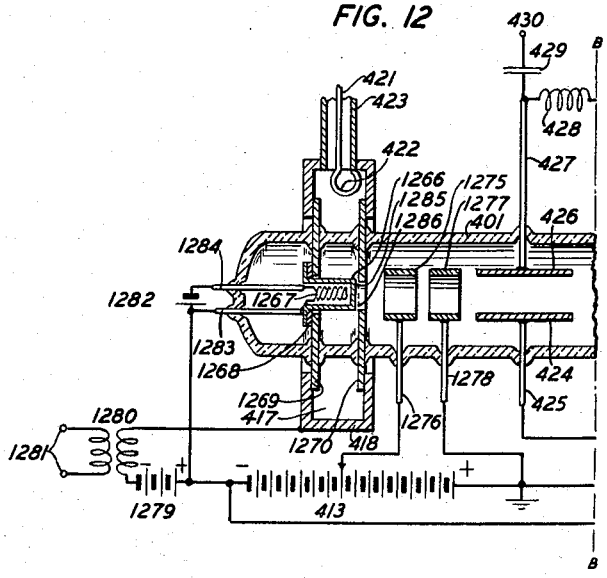
Fig. 12 shows a modification of the structure of Fig. 4 in which the high frequency control of the electron stream is had by means of a control grid adjacent to the cathode.

In Fig. 12 is shown a modification of Fig. 4 which may be substituted for the portion of Fig. 4 to the left of the vertical broken line B—B and in which the radio frequency signal is impressed on the electron stream which corresponds to that from cathode 402 in Fig. 4 by positioning a control grid 1286 opposite to an emissively coated cathode 1266 in the cavity resonator 417. By this means the field of the resonator may directly produce density modulation of the electron stream rather than velocity modulation as in the showings of Figs. 4, 9, 10 and 11. The space between the surface of the cathode 1285 which is coated with the emissive coating and the control grid 1286 should be small for best results. The cathode 1266 is heated by the coiled heater 1267. One end of the heater is connected to the cathode and the cathode connection is brought out through the envelope 401 by lead 1283. The other end of the coiled heater is brought out of the envelope on lead 1284 and a battery 1282 is connected between leads 1283 and 1284 to heat the cathode. The cathode structure is by-passed for radio frequencies to disc electrode 1269 which is separated from a flange on the cathode by a thin mica, ceramic or other insulating sheet 1268. Disc electrode 1270 which bears the control grid 1286 and disc electrode 1269 are interconnected by the structure 418 so as to form a cavity resonator 417 which is resonant to the input radio frequency. This resonator is excited by the coupling loop 422 connected to the radio frequency input by the coaxial line 421—423. When the resonator is excited, a radio frequency voltage appears between the cathode surface 1285 and the grid 1286 and serves to impress a radio frequency signal on any electron stream emitted from the cathode surface 1285. Whether or not electrons are emitted from the cathode surface 1285 can be determined by a biasing voltage applied between the cathode 1266 and the grid 1286 by means of battery 1279 and by pulses or other signals impressed between cathode 1266 and grid 1286 by means of transformer 1280. Such pulsed signals may be applied to control terminals 1281. These terminals function the same as terminals 411 and ground in Fig. 4. The electrons emitted from the cathode surface 1285 may be focused on the aperture of electrode 431 of Fig. 4 by means of two tubular electrodes 1275 and 1277. The focusing tube 1275 is connected to a mid-point of battery 413 by means of lead 1276 and then focusing tube 1277 is connected to the positive pole of battery 413 by means of lead 1278. For clarity the deflecting plates 424 and 426, their leads, terminal 430 and elements 428 and 429 described with Fig. 4 are shown.

Figs. 13 and 14 show another structure for accomplishing much the same purpose as that accomplished by the tube shown in Fig. 4 and the modifications of that tube shown in Figs. 9, 10, 11 and 12. In Fig. 13, 1301 is the glass envelope of a traveling wave amplifier tube. 1302 is a cathode electrode with a face 1307 coated with electron emissive material. 1303 is a coiled heater which at one end is connected to the cathode 1302 and at the other end by means of lead 1304 to one pole of the battery 1306. The other heater lead is connected through the cathode lead 1305 to the other pole of the battery 1306 so that the cathode may be heated and emit electrons from the face 1307. 1308 is a modulator and focusing electrode which is biased with respect to the cathode by battery 1326 and upon which a control voltage from control terminals 1329 may be applied through transformer 1328. Thus, electrons may be made to flow or not to flow in accordance with the control voltage applied to terminals 1329. These terminals function the same as terminal 411 and ground in Fig. 4. 1309 is an accelerating and focusing electrode which is held positive with respect to cathode 1302 by means of battery 1327. Electrons accelerated from the cathode by this electrode pass through grid 1310 and through the open center of the tube and are finally collected on electrode 1317 which is connected to the positive pole of battery 1327. An input radio frequency is applied to the wave guide 1315 (the same as applied to coaxial line 421, 423 of Fig. 4) and by means of the stub 1330 on member 1313 connected to the end of the helix the signal is transferred to the helix 1311. The stub 1330 crosses the wave guide and couples to it. The cylindrical member 1313 fits inside the glass envelope and with the metal flange of wave guide 1315 forms a by-pass condenser. The pitch of the helix is so chosen that the phase velocity of the wave traveling along the helix is substantially equal to the velocity given to the electrons by battery 1327. In the space between the wave guide 1315 and the center of the helix length at 1318 the electrons interact with the radio frequency field of the helix so as to produce an increasing modulation of the velocity and density of the electron stream as it travels through the helix. Loss material 1318 deposited near the center of the helix length on the ceramic rods 1312 which support the helix absorbs most of the electromagnetic part of the wave traveling to the right along the helix. The bunched, or density-modulated, electron stream, however, excites an increasing wave in the right-hand part of the helix, beyond 1318, and this radio frequency signal is amplified in traveling along the helix and is radiated into the output wave guide 1316 (which corresponds to the output wave guide 448 of Fig. 4) by means of the coupling stub 1331 on member 1314 which is connected to the end of the helix and extends across the wave guide. Member 1314 forms part of a by-pass condenser as does 1313.

A solenoid 1319 supplied by a suitable direct-current source may be used to focus and confine the electron stream. It may be advantageous to use a magnetic shield 1320 around the solenoid. A coil 1321 is disposed so as to produce a magnetic field transverse to the axis of the helix and to the magnetic field produced by the solenoid 1319. The inductance of the coil 1321 is resonated by the capacitance of condenser 1322. The coil 1321 is excited by a sweep signal applied to the coaxial line consisting of inner and outer conductors 1325 and 1324 respectively which correspond to terminal 430 and ground of Fig. 4. These conductors lead to a coupling coil 1323 which has mutual inductance with the sweep coil 1321. Thus a sinusoidal signal applied to the coaxial line 1324, 1325 will cause a strong sinusoidal magnetic field in coil 1321 which will have a strong deflecting action on any electrons emitted from cathode 1302, so that electrons can pass from the left or input end of the traveling wave tube into the right or output end of the traveling wave tube only at times when the magnetic field of coil 1321 is near zero. Thus if radio frequency is applied to wave guide 1315, radio frequency output will be observed in wave guide 1316 only for brief times when the sinusoidal field due to coil 1321 is near zero. Whether or not a pulse or signal appears in wave guide 1316 at these times depends upon the potential of the modulator electrode 1308 with respect to the cathode 1302 as determined by the biasing battery 1326 and the control signal applied to control terminals 1329.

Fig. 14 is a diagram in perspective to indicate more clearly the mechanical assembly of some of the parts of the tube of Fig. 13. The designations of the elements are the same as in Fig. 13.

Fig. 15 shows a modification of the tube shown in Figs. 13 and 14 in which electric rather than magnetic deflection of the electron beam is used. In this case the helix 1311 of Fig. 13 is broken near the center into two parts 1511 and each free end is terminated by resistive material 1518 deposited on the support rods at that place, the support rods also being broken into two parts 1512. Between these ends of the helix, which are drawn apart, two deflecting plates 1530 and 1531 are located. Between the deflecting plates 1530 and 1531 are connected an inductance 1521 and a capacitance 1522. A lead 1532 to the center of inductance 1521 is connected to the positive terminal of battery 1327 so that the deflecting plates will be at the same direct-current potential as the helix. The sweep signal is applied to this resonant circuit, 1521, 1522, by means of a coupling coil 1523 which is connected to the coaxial line formed by conductors 1324 and 1325. Fig. 16 shows the shape of the deflecting plates 1530 and 1531.

Fig. 17 shows another tube to accomplish much the same purpose as the tubes shown in Figs. 4 and 13. In this figure, 1701 designates the evacuated glass envelope of a traveling wave amplifier type of tube. Electrons are emitted from the coated ring-shaped portion 1706 of the cathode 1702. The cathode 1702 is heated by a coil heater 1704 which is connected to the cathode at one end. The cathode is connected to lead 1703 and the free end of the heater is connected to lead 1705. A potential is applied across the heater by means of battery 1728 so as to heat the heater and cathode. A helix 1707 is wound on a ceramic rod 1712 with such a pitch as to have a phase velocity, at the frequency to be transmitted and amplified, substantially equal to the electron velocity which is produced by accelerating the electrons from cathode 1706 by battery 1729. The rod 1712 upon which the helix is wound is supported at the left end by radial metal fins 1709 connected to a metal sleeve 1708 which fits in and rests against the glass envelope 1701. The rod 1712 is supported at the right end by radial metal fins 1711 connected to a metal sleeve 1710 which rests against the inside of the glass envelope 1701. The left end of the helix is connected to the metal sleeve 1708 which, together with the flange of input wave guide 1724, forms a by-pass condenser for coupling wave energy from input wave guide 1724 to the helix. The right end of the helix is connected to the metal sleeve 1710 which, together with the flange of output wave guide 1725, forms a by-pass condenser for coupling wave energy from the helix to the output wave guide 1725. The helix is surrounded by thin metal tubes 1714 and 1716 which rest against the inside of the glass envelope 1701. These metal sleeves have interleaved portions as shown in Fig. 18. The break between the interleaved portions 1714 and 1716 is to the left of the center of the helix. Sleeve 1714 is connected by means of a lead 1715 to one end of an inductance 1718 and sleeve 1716 is connected by means of lead 1717 to the other end of inductance 1718. Inductance 1718 is resonated by condenser 1719 at the sweep frequency, and this resonant circuit, inductance 1718 and condenser 1719, is excited by a sweep signal applied to terminals 1730 which are connected to the coupling coil 1720. The helix 1707 is connected by means of lead 1722 to the positive pole of battery 1729 and a tap on inducance 1718 is connected to the positive pole of battery 1729 so as to maintain the sleeves 1714 and 1716 at the same mean potential as the helix 1707. The electron flow from the cathode 1706 is controlled by the modulating grid 1736 which is supported in front of the cathode by the metal sleeve 1735, this sleeve being supported by the tube envelope 1701. The grid is connected through the sleeve 1735 to the lead 1734, brought out through the tube envelope. The voltage from the biasing battery 1732 is applied to the grid 1736 through the resistor 1733 to allow the application of a pulse or other signal from input terminals 1731 through the capacitor 1737 to the modulating grid. Electrons are accelerated from the coated surface 1706 of the cathode by the electrode 1708 which is attached to the left end of the helix as shown, and thence to the positive pole of battery 1729. The tubular electron stream so formed is guided by a magnetic field, produced by solenoid 1726, through the annular space between the helix 1707 and metal sleeves 1714 and 1716 to the collector 1721, which is connected to battery 1729 through lead 1723. A magnetic shield 1727 may surround solenoid 1726. In operation radio frequency energy is applied to wave guide 1724. This is transferred to the left end of the helix 1707 where the helix passes across the wave guide to the connection to member 1708. The electron stream, which will be present if the modulating grid 1736 is at such a potential as to allow electrons to be emitted from the cathode 1706, interacts with the field of the helix to produce an increasing electromagnetic and space charge wave which travels along the tube to the right. Most of the electromagnetic portion of this wave is absorbed by the loss material 1713 sprayed or coated on the ceramic rod 1712 near the center of the helix. If no deflection voltage appears between the sleeves 1714 and 1716 a density modulated electron stream will pass this region of loss material 1713 and will induce a signal on the helix to the right of the loss material. This signal will be substantially amplified by the traveling wave amplifier action and will be radiated from the end of the helix into the output wave guide 1725. If, however, there is substantial voltage between electrodes 1714 and 1716, the electron stream will be intercepted by these electrodes and there will be no radio frequency output in the wave guide 1725. Thus, when a sufficiently strong sweep signal is applied to the sweep terminals 1730 and a radio frequency signal is applied to the input wave guide 1724, there may be a series of radio frequency pulses in the output wave guide 1725 occurring twice each cycle of the sweep frequency at times when the sweep voltage applied between electrodes 1714 and 1716 is near zero. Such radio frequency pulses will not, of course, be present if there is no radio frequency input signal to wave guide 1724, or, when connected into the transmitting system if there is no pulse signal applied to the terminals 1731 to permit an electron stream from the cathode. In connecting this tube into the transmitting system in place of the Fig. 4 showing, terminals 1731 correspond to terminals 411 and ground of Fig. 4, the terminals 1730 correspond to terminals 430 and ground of Fig. 4, the input wave guide 1724 corresponds to the input coaxial line 421, 423, of Fig. 4 and the output wave guide 1725 corresponds to the output wave guide 448 of Fig. 4.

One feature of the invention which is present in all of the foregoing embodiments is the rectilinearity of the electron beam when the tube is in the operative condition. With an electron beam which is substantially straight throughout its length, focussing electrodes and coils may be readily aligned between cathode and collector, and consistent dependable results may be attained. Thus, the deflection plates and coils, when operative, deflect the electron stream from rectilinearity and disable the tube; during gating periods when the tube is operative, however, the electron stream is straight.

Figs. 1 and 2 are single-line diagrams; that is, interconnections are shown as single lines. These lines may denote a two-wire line, a coaxial line, a wave guide or whatever type of transmission circuit may be known in the art as being appropriate considering the type of energy to be transmitted and the apparatus to be connected. It may be noted in the various embodiments illustrated that different types of terminals and transmission lines are shown. Proper methods of connecting such various types of lines are well known in the art. Although the instant electron tubes of the traveling wave type and associated circuits have been described as used in a pulse code modulation system, they would also be useful in many other types of high frequency apparatus, such as for producing very short pulses in a pulse-echo transmitter, for use as an electronic gate in sorting out and following signals in a pulse-echo receiver, or for producing very short pulses to be used as a test signal of broad band width.

It is to be understood that the above-described arrangements are illustrative of the principles of the invention. Numerous other arrangements may be devised by those skilled in the art without departing from the spirit and scope of the invention.

What is claimed is:

1. In high frequency apparatus, an evacuated envelope, a cathode within said envelope, means for producing a stream of electrons along a predetermined path from said cathode, a distributed high frequency transmission circuit extending along a portion of said predetermined path in energy coupling proximity thereto for propagating an electromagnetic wave in interacting relation with an electron stream passing along said predetermined path, whereby energy is transferred from the electron stream to said circuit, and electron deflection means located along said path for interrupting the interaction between the propagating electromagnetic wave and the electron stream by deflecting said electron stream away from said predetermined path and out of interacting relation with said circuit, thereby interrupting the transfer of energy to said circuit.

2. An electronic device for producing short pulses of high frequency energy at predetermined times comprising an evacuated envelope containing a transmission line comprising a helical conductor and having at the said high frequency an axial wave propagation velocity within the range of practical electron velocities, a cathode, an apertured member having its aperture aligned with the axis of said helical conductor, means comprising accelerating electrodes and potential sources connected thereto for producing a beam of electrons from the cathode to pass through the aperture in said member and along the axis of said helical conductor to a collector at a velocity substantially the same as said axial wave propagation velocity, an electrode adjacent to the cathode along the path of the electron beam for controlling the electron emission from said cathode, means farther along the path of the electron beam for modulating the velocities of the electrons in said beam at said high frequency, deflecting electrodes still farther along the path of the electron beam for deflecting said electron beam across the aperture in said apertured member which is still farther along the path of the beam and is between the deflecting electrodes and said helical conductor, said electron beam passing along said helical conductor only when not deflected from said aperture, a second cathode annular in shape, means comprising an accelerating electrode and potential source connected thereto for producing a hollow electron beam along a path from said second cathode in coupling proximity with said helical conductor to said collector at a velocity substantially the same as said axial wave propagation velocity, resistive means terminating the helical conductor at the end nearest the cathodes, means coupled to the helix at the end farthest from the cathode for deriving high frequency energy therefrom, and terminals connected to said deflecting electrodes for applying deflecting voltage thereto.

3. A device according to claim 2 in which the path of the hollow electron beam surrounds the helix.

4. A device according to claim 2 in which the path of the hollow electron beam is within the helix.

5. A device according to claim 2 in which a metal cylinder surrounds the path of the hollow electron beam and is maintained at a potential lower than the potential of the helical conductor.

6. A device according to claim 2 in which an electron beam focusing electrode is located between said electron velocity modulating means and said cathode and is maintained at a direct-current potential with respect to the cathode different from the direct-current potential of an adjacent electrode with respect to the cathode.

7. A device according to claim 2 in which an electron beam focusing electrode is located between said electron velocity modulating means and said electron beam deflecting electrodes and is maintained at a direct-current potential with respect to the cathode different from the direct-current potential of an adjacent electrode with respect to the cathode.

8. A device according to claim 2 in which a pair of electrodes held at different direct-current potentials with respect to the cathode are interposed between the modulating means and the deflecting plates to form an electron lens.

9. An electron device for producing short pulses of high frequency energy at predetermined times comprising a metallic tube containing a number of apertured spaced transverse metallic discs to form a loaded wave guide having an axial phase velocity at said high frequency within the range of practical electron velocities, a cathode, an apertured plates, means comprising an accelerating electrode and a potential source connected thereto for producing a beam of electrons from the cathode to pass through the aperture in said plate and along the axis of said metallic tube at a velocity substantially the same as said axial wave propagation velocity, an electrode adjacent to said cathode along the path of the beam for controlling the emission from the cathode, means farther along the path of the electron beam for modulating the velocities of the electrons in said beam at said high frequency, deflecting electrodes farther along the path of the electron beam and disposed on opposite sides thereof for deflecting said electron beam across said aperture in said plate which is still farther along the path of the beam and is between the deflecting electrodes and said wave guide, the said electron beam passing through said wave guide only when not deflected from said aperture, a second cathode annular in shape, means comprising an accelerating electrode and potential source connected thereto for producing a hollow electron beam from said second cathode and through said wave guide in the same direction as the first-mentioned electron beam and at substantially the same velocity, resistive means terminating the said wave guide at the end nearest the cathodes and coupling means at the other end of the wave guide to derive high frequency energy therefrom, and terminals connected to said deflecting electrodes for applying a deflecting voltage thereto.

10. An electronic device for producing short pulses of high frequency energy at predetermined times comprising an evacuated envelope containing a helical conductor transmission line having at said high frequency an axial wave propagation velocity within the range of practical electron velocities, a cathode, an apertured plate aligned with said cathode and said transmission line, means comprising accelerating electrodes and potential sources connected thereto for producing a beam of electrons from the cathode to pass through the aperture in said plate and along the axis of said helical conductor to a collector at a velocity substantially the same as said axial wave propagation velocity, an electrode adjacent to said cathode along the path of the electron beam for controlling the electron emission from the cathode, means for connecting this same electrode to a high frequency circuit for control of electron emission at said high frequency, deflecting electrodes further along the path of the electron beam and disposed on opposite sides thereof for deflecting said electron beam across said aperture in said plate which is still farther along the path of the beam and is between the deflecting electrodes and said helix, the said electron beam passing along said helix only when not deflected from said aperture, a second cathode annular in shape, means comprising an accelerating electrode and potential source connected thereto for producing a hollow electron beam from said second cathode along and in proximity to said helix and axially directed to said collector at a velocity substantially the same as said axial wave propagation velocity, and resistive means terminating the helical conductor at the end nearest the cathodes.

11. An electronic device for producing short pulses of high frequency energy at predetermined times comprising an evacuated envelope containing a helical conductor transmission line having at said high frequency a certain axial wave propagation velocity within the range of practical electron velocities, loss material capable of absorbing high frequency energy in proximity to the helix near the center of its length, a cathode, means comprising an accelerating electrode and potential source connected thereto for producing a beam of electrons from the cathode along the axis of the helical conductor to a collector at a velocity substantially the same as said wave propagation velocity and an electrode adjacent to the cathode in the path of the electron beam for controlling the electron emission from said cathode, a wave transmission circuit external to said envelope coupled to the end of the helical conductor nearest the cathode for impressing a high frequency wave on the helix, a wave transmission circuit coupled to the other end of the helical conductor for deriving high frequency energy therefrom, a high frequency magnetic electron beam deflecting coil located in close proximity to the path of the electron beam between the end of the helix nearest the cathode and the location of said loss material, means coupled to said deflecting coil for supplying deflecting energy thereto, and leads connecting to said control electrode for controlling the emission from the cathode.

12. An electronic device for producing short pulses of high frequency energy at predetermined times comprising an evacuated envelope containing two helical conductor transmission lines disposed along a common axis and spaced apart longitudinally, each adjacent end being terminated by resistive material capable of absorbing high frequency energy, each said line having at the said high frequency a certain axial wave propagation velocity within the range of practical electron velocities, a cathode, means comprising an accelerating electrode and potential source connected thereto for producing a beam of electrons from the cathode along the axis of the helical conductor lines to a collector at a velocity substantially the same as said wave propagation velocity, an electrode adjacent to the cathode in the path of the electron beam for controlling the electron emission from said cathode, a pair of deflecting plates in the space between the two helical conductor lines disposed on opposite sides of the path of the electron beam to cause the interruption of interaction between said beam and the second of said helical conductor transmission lines by diverting said beam from said axis, a wave transmission circuit external to the envelope coupled to the end of the helical conductor nearest the cathode for impressing a high frequency wave on the helix, a wave transmission circuit coupled to the other end of the helical conductor for deriving high frequency energy therefrom, terminals connected to said deflecting plates for supplying electron beam deflecting voltage thereto and leads connected to said control electrode for controlling the emission from the cathode.

13. An electronic device for producing short pulses of high frequency energy at predetermined times comprising an evacuated envelope containing a helical conductor transmission line having at said high frequency a certain axial wave propagation velocity within the range of practical electron velocities, a ring shaped cathode, means comprising an accelerating electrode and potential sources connected thereto for producing a hollow beam of electrons from the cathode along a path surrounding said helical conductor to a collector at a velocity substantially the same as said wave propagation velocity, an electrode adjacent to said cathode along the path of the electron beam for controlling the electron emission from the cathode, two metal tubes end to end extending along said helical conductor external to it and to the path of the hollow electron beam and being spaced apart slightly longitudinally and having interleaved portions at their adjacent ends which are located longitudinally between the center of the helix and the end of the helix nearest the cathode, the two said tubes having terminals for connecting to a source of deflecting voltage and serving to deflect the electron beam, and loss material capable of absorbing high frequency energy located near the longitudinal center of the helical conductor, external to the envelope a wave transmission circuit coupled to the end of the helical conductor nearest the cathode for impressing a high frequency wave on the helix, a wave transmission circuit coupled to the other end of the helical conductor for deriving high frequency energy therefrom, a coupling circuit connected to said leads of said deflecting tubes for supplying deflecting voltage thereto and terminals connected to said control electrode for controlling the emission from the cathode.

14. In combination, a charged particle emitter and a collector defining a charged particle stream along a predetermined path therebetween, a slow wave transmission circuit paralleling said path in coupled relation thereto whereby amplifying interaction will take place between the charged particle stream and the slow wave transmission circuit, and deflection means located along said predetermined path between the emitter and collector for interrupting said interaction by deflecting said stream away transversely from said predetermined path.

15. A device as set forth in claim 14, in which a variable voltage source is coupled to said deflection means for modifying said interaction, and said deflection means is located between the beginning of said slow wave transmission circuit and said collector.

16. A device as set forth in claim 14, wherein said predetermined path is substantially a straight line, whereby said particles may be readily focused and will not become unduly dispersed.

17. A device as set forth in claim 14 including an electrode having a pulse shaping aperture therethrough, said electrode extending transversely to said path and the aperture being aligned with said predetermined path.

18. In a device which utilizes the interaction between an electron beam and an electromagnetic wave for amplifying the wave, a wave propagating circuit; means for providing a signal modulated electron beam for exciting a high frequency electromagnetic wave for travel along the circuit comprising means for forming an electron beam and for projecting said beam in coupling relation with the wave circuit for interaction with an electromagnetic wave propagating along said circuit, and means for modulating said beam in accordance with the amplitude variations of a high frequency electromagnetic wave; and means for modulating the amplitude of the electromagnetic wave excited along said wave propagating circuit by deflecting the electron beam out of coupling relation with said circuit, whereby the interaction between the beam and the electromagnetic wave is interrupted.

19. In a device which utilizes the interaction between an electron stream and an electromagnetic wave, an electron source, means for producing a stream of electrons along a predetermined path from said source, first means along said path in coupling proximity with said stream for modulating said electron stream in accordance with the variations of an electromagnetic wave, said means along said path downstream of said first means and in coupling relation with said electron stream for extracting wave energy from said stream, and means between said source and said second means for deflecting said stream out of coupling relation with said second means whereby the transfer of wave energy from said stream to said second means is interrupted.

20. In a device which utilizes the interaction between an electron stream and an electromagnetic wave, an electron source, means for producing a stream of electrons along a predetermined path from said source, a helical slow wave transmission circuit including a first and second plurality of turns extending along said path for propagating an electromagnetic wave in coupling relation to the electron stream passing along said path, the first plurality of turns being at the upstream end of said helical slow wave circuit and comprising means for modulating said stream in accordance with the variations of an electromagnetic wave, the second plurality of turns being at the opposite end of said helical slow wave circuit and comprising means for extracting wave energy from said electron stream, and means for diverting said stream away from said path whereby the amount of energy extracted by said second plurality of turns is varied.

21. In a device which utilizes the interaction between an electron stream and an electromagnetic wave, an electron source, means for producing a stream of electrons along a predetermined path from said source, a helical slow wave transmission circuit including a first and second plurality of turns extending along said path for propagating an electromagnetic wave in coupling relation to the electron stream passing along said path, the first plurality of turns being at the upstream end of said helical slow wave circuit and comprising means for modulating said stream in accordance with the variations of an electromagnetic wave, the second plurality of turns being at the opposite end of said helical slow wave circuit and comprising means for extracting wave energy from said electron stream, and means for diverting said stream away from said path whereby the amount of energy extracted by said second plurality of turns is varied, said diverting means comprising electric field producing means located between said first and second plurality of turns.

22. The combination of elements as set forth in claim 20 wherein said diverting means comprises magnetic field producing means located between said first and second plurality of turns.

23. In a device which utilizes the interaction between an electron stream and an electromagnetic wave, an electron source, a collector means producing a stream of electrons along a predetermined path from said source to said collector, a distributed high frequency transmission circuit extending along a portion of said predetermined path for propagating an electromagnetic wave in energy coupling relation with an electron stream passing along said path whereby energy is transferred to the propagating wave from said stream, an apertured member positioned between said transmission circuit and said electron source, said apertured member extending transverse to said predetermined path and having its aperture aligned with said path, and means located along said electron path between said source and said transmission circuit for interrupting the transfer of energy to the propagating wave by diverting the electron stream away from the aperture in said member.

24. In a device which utilizes the interaction between an electron beam and an electromagnetic wave, an electron source, a collector means for producing a beam of electrons along a path from said source to said collector, distributed transmission circuit extending along a portion of said path in energy coupling relation thereto whereby energy may be transferred to said transmission circuit from said beam, an apertured member positioned between said transmission circuit and said electron source extending substantially transverse to the path of the electron beam and having its aperture aligned with said path, and means for periodically varying the amount of energy coupled to said transmission circuit comprising means for periodically sweeping said beam across said aperture for varying the number of electrons penetrating therethrough for flow along said path.

25. In a device which utilizes the interaction between an electron stream and an electromagnetic wave, an electron source, means including a control electrode for producing a stream of electrons along a predetermined path from said source, a distributed high frequency transmission circuit extending along a portion of said path for propagating an electromagnetic wave in energy coupling relation with an electron stream passing along said predetermined path, whereby energy is transferred to said propagating wave from said electron stream, means for varying the voltage applied to said control electrode for modulating the density of said electron stream, and means located along said predetermined path between said electron source and said distributed circuit for interrupting energy transfer to said transmission circuit by diverting the electron stream away from said predetermined path and out of energy coupling relation with the wave propagating along said distributed circuit.

26. In a device which utilizes the interaction between an electron stream and an electromagnetic wave, an electron source, means including an accelerator anode and a control electrode for producing an electron stream along a predetermined path from said source, means modulating the velocity of said electron stream in accordance with the signal variations of an electromagnetic wave, means along said predetermined path downstream of said velocity modulating means for extracting wave energy from the velocity modulated electron stream passing along said predetermined path, means for varying the voltage applied to said control electrode for modulating the density of the electron stream, and means for simultaneously varying the amount of energy transferred to said wave energy extracting means by diverting said electron stream away from said predetermined path.

27. In a device which utilizes the interaction between an electron stream and an electromagnetic wave, an electron source, a control electrode for controlling the electron emission from said source, means connected to said control electrode for applying a voltage to said electrode which is negative with respect to the voltage of said electron source, whereby electron emission from said source is normally prevented, means for applying positive voltage pulses to said control electrode for producing an electron stream along a predetermined path from said source during the pulse interval, means along said path for modulating the velocity of said electron stream in accordance with the signal variations of an electromagnetic wave, means in coupling relation with said predetermined path downstream of said velocity modulating means for extracting wave energy from the velocity modulated electron stream passing along said predetermined path, and means for varying the amount of energy transferred to said energy extracting means by diverting during the pulse interval said electron stream away from said predetermined path.

References Cited in the file of this patent

UNITED STATES PATENTS

| Number | Name | Date |
| --- | --- | --- |
| 1,981,350 | Engel | Nov. 20, 1934 |
| 2,064,469 | Haeff | Dec. 15, 1936 |
| 2,409,179 | Anderson | Oct. 15, 1946 |
| 2,433,044 | Haeff | Dec. 23, 1947 |
| 2,575,383 | Field | Nov. 20, 1951 |
| 2,584,308 | Tiley | Feb. 5, 1952 |
| 2,603,772 | Field | July 15, 1952 |
| 2,611,101 | Wallauschek | Sept. 16, 1952 |
| 2,687,494 | Adler | Aug. 24, 1954 |